United States Patent [19]

Grigoriev et al.

[11] Patent Number: 4,770,085
[45] Date of Patent: Sep. 13, 1988

[54] HYDRAULIC JACK

[75] Inventors: Sergei M. Grigoriev; Alexandr N. Semenov; Vladimir P. Samoilov, all of Moscow, U.S.S.R.; Tom P. Sadovsky, deceased, late of Moscow, U.S.S.R., by Anna I. Sadovskaya, administrator

[73] Assignee: Spetsialnoe Konstruktorskotekhnologicheskoe Bjuro Glavmosinzhstroja Pri Mosgorispolkome, Minsk, U.S.S.R.

[21] Appl. No.: 522,158
[22] PCT Filed: Oct. 29, 1982
[86] PCT No.: PCT/SU82/00034
 § 371 Date: Jul. 5, 1983
 § 102(e) Date: Jul. 5, 1983
[87] PCT Pub. No.: WO83/01811
 PCT Pub. Date: May 26, 1983

[30] Foreign Application Priority Data

Nov. 19, 1981 [SU] U.S.S.R. ............................ 3356876
Jun. 22, 1982 [SU] U.S.S.R. ............................ 3457266

[51] Int. Cl.$^4$ .................................................. F16J 1/00
[52] U.S. Cl. ........................................ 92/172; 92/242; 92/253

[58] Field of Search ................ 92/250, 251, 252, 253, 92/198, 200, 172, 242, 243, 249, 240, 246

[56] References Cited

U.S. PATENT DOCUMENTS

| 880,361 | 2/1908 | Cook | 92/200 |
|---|---|---|---|
| 2,136,239 | 11/1938 | Ernst | 92/172 X |
| 2,437,056 | 3/1948 | Vroman | 92/252 |
| 3,063,764 | 11/1962 | Lowery | 92/253 |
| 3,509,796 | 5/1970 | Osborne | 92/252 |
| 4,003,297 | 1/1977 | Mott | 92/253 |

OTHER PUBLICATIONS

E. L. Carlotta, *Synthetic Rubber O-Ring Seals,* Jun. 1951, pp. 130–135.

Primary Examiner—Edward K. Look
Attorney, Agent, or Firm—Lilling & Greenspan

[57] ABSTRACT

A hydraulic jack includes a body (1) with front (2) and rear (3) covers and a rod (4) moving relative to said body (1) and having at least one projection made therein and mounting an additional member (7) and at least two grooves which form the respective projection (8) and of which each accomodates piston semi-rings (6) installed therein by pairs, the rod (4) portion having the projections (8) and the grooves forming a piston unit (5).

1 Claim, 2 Drawing Sheets

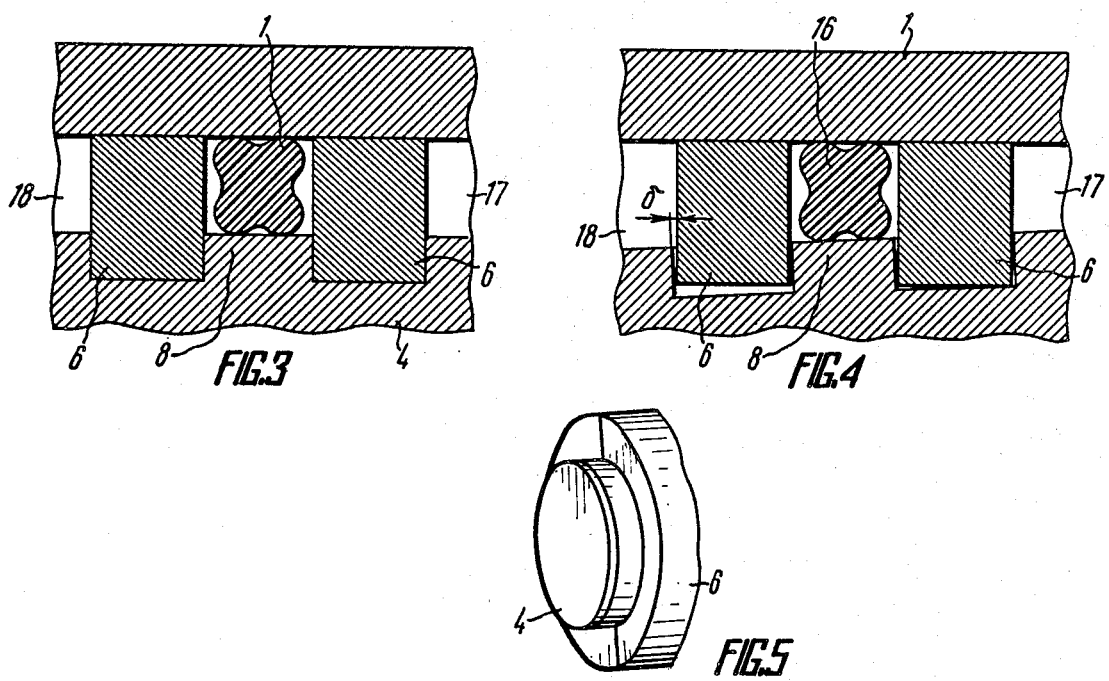

HYDRAULIC JACK

BACKGROUND OF THE INVENTION

1. Field of Invention

The present invention relates to hydraulic devices and, more particularly, to hydraulic jacks.

The invention can find use in volumetric hydraulic motors with a limited, rectilinear, reciprocating motion of the driven link.

2. Description of the Prior Art

Known in the art is a hydraulic jack comprising a body with passages for supplying working fluid, front and rear covers and a rod mounting a piston placed on a sealing and secured by a nut and a stop (cf. "Hydraulics and Hydraulic Drive of Mining Machines" by P. V. Koval, Moscow, "Machinostroenie" Publishers, 1979, p. 131).

The known hydraulic jacks are disadvantageous in that they employ a great number of different-type parts and units, which complicates their assembly and disassembly.

Also known in the art is a hydraulic jack comprising a body with front and rear covers and a rod which moves relative to the body and carries a piston unit, the latter comprising semi-rings and one or more sealing members (cf. "Hydraulic Jacks" by V. A. Marutov and S. A. Pavlovsky, Moscow, "Machinostroenie" Publishers, 1966, p. 45, FIG. 39). In this hydraulic jack the piston of the piston unit is mounted on the rod with a seal and is secured thereon by a nut and a stop.

These devices are also disadvantageous in that they employ a great number of different-type parts and units which complicates their assembly and disassembly.

SUMMARY OF THE INVENTION

The present invention resides in provision of a hydraulic jack of a design simpler than that of the conventional hydraulic jacks and that requires less labour and time required during its assembly and disassembly.

The task is accomplished by a hydraulic jack comprising a body with front and rear covers and a rod that moves relative to the body and has a piston unit comprising semi-rings and at least one sealing member. According to the invention, the rod has at least one projection made thereon and mounts the sealing member, and at least two grooves that form the respective projection and of which each accomodates semi-rings mounted therein by pairs, the rod portion having the projections and grooves forming the piston unit.

It is expedient to make each semi-ring of a T-shape cross-section.

BRIEF DESCRIPTION OF THE DRAWINGS

The following description of the invention is clarified by examples of its embodiment given with reference to the accompanying drawings, in which:

FIG. 3 is an enlarged view of a semi-ring with one double-action sealing member according to the invention;

FIG. 4 shows the same semi-ring during possible lateral displacements of the rod; and FIG. 5 is a view taken along arrow A in FIG. 3 of the semi-rings of the piston unit.

DESCRIPTION OF THE PREFERRED EMBODIMENTS

Figure 1:
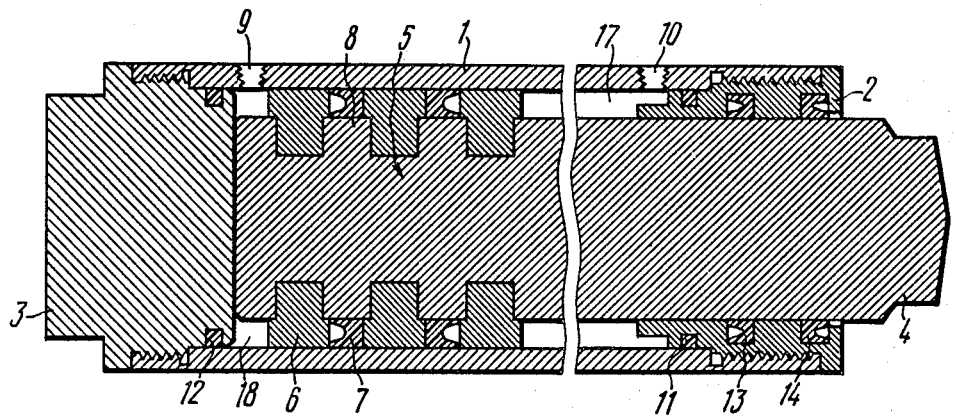
FIG. 1 shows a hydraulic jack according to the invention with semi-rings of a T-shaped cross-section.

A hydraulic jack comprises a body 1, front 2 and rear 3 covers and a rod 4 which is disposed inside the body 1. The body 1 and the rod 4 are made so that they can move relative to each other. The rod 4 has a portion on which a piston unit 5 is mounted, the latter comprising at least two pairs of semi-rings 6 and sealing members 7 whose number depends on their type.

The rod 4 has lands or projections 8, each of which mounts one sealing member 7, and grooves that form the respective projections 8, the grooves accomodating the guide semi-rings 6 mounted therein by pairs. Thus, the piston unit 5 is formed on the rod 4 portion that has the projections 8 and the grooves, whereby in the design under description there is practically no such part as a piston, which considerably simplifies the design of the hydraulic jack as a whole, as well as its assembly and disassembly.

The body 1 has grooves 9 and 10 used for supplying working fluid. The front cover 2 has a seal 11, and the rear cover has a seal 12.

The rod 4 is provided with a seal 13 and a dirt remover 14.

Figure 2:
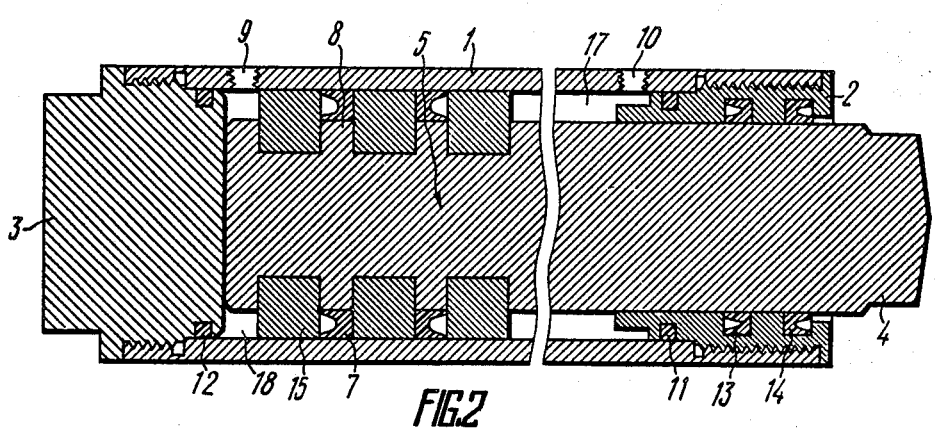
FIG. 2 shows another variant of the embodiment of a hydraulic jack with semi-rings of a square-shaped cross-section, according to the invention.

FIG. 2 shows another variant of the embodiment of the hydraulic jack, wherein each semi-ring 15 has a square-shaped cross-section instead of the T-shaped cross-section shown in FIG. 1. It is expedient to use hydraulic jacks of the type shown in FIG. 1 in the cases of large (over 180 mm) diameters of the inner boring or the body 1 and great (over 25 MPa) working pressures.

FIGS. 3 and 4 show an enlarged view of the piston unit 5 portion (FIG. 1). The semi-rings 6 (FIGS. 3 and 4) are separated by one sealing member 16 which is characterized by a double-sided sealing action, which contributes to further simplification of the design of the hydraulic jack.

In the course of operation of the hydraulic jack when no transverse forces act on the rod 4 (FIG. 3), the semi-rings 6 are fitted into the grooves of the rod 4 without practically any gap.

When there are transverse forces the semi-rings 6 are fitted with a small gap $\delta$ (FIG. 4), which prevents skewing of the semi-rings 6 and reduces wear of the body 1.

FIG. 5 shows a view taken along arrow A on the piston unit 5 from the side of the piston cavity. It shows very well the design of the piston semi-rings 6.

The hydraulic jack functions as follows.

With the working fluid being supplied through one of the passages 9 or 10 alternately into the space 17 or 18 of the body, the rod 4 reciprocates and the sealing members 7 (16) simultaneously seal the rod 4 and the piston unit 5.

In case one of the sealing members 7 (16) is damaged, the rod 4 is to be taken out of the body 1, the semi-rings 6 are to be taken out of the grooves of the rod 4, whereupon the sealing members 7 (16) are easily taken off the projections 8 of the rod 4 since their width equals the width of the projections 8. The damaged member is replaced, whereas the non-completely deformed member can be used again as it was not extended while being taken off the projection 8.

If, in the course of operation of the hydraulic jack, the rod 4 has displaced transversely (FIG. 4), the semi-rings 6 fitted with a gap $\delta$ self-adjust themselves relative to the body 1, which precludes splitting of the piston unit 5 and, consequently, decreases the mutual wear of the body 1 and the piston unit 5.

As a result, the design of the hydraulic jack is simplified, assembly and disassembly of the hydraulic motor become easier, and its operational characteristics are improved.

The present invention can be used in mining combines, mechanized supports, excavators, loading machines, scrapers, bulldozers and other machines in which the translational or turning motion of the actuating mechanisms is required.

We claim:
1. A hydraulic jack comprising a body with passages for supplying working fluid, front and rear covers, a rod having an axis and a plurality of circumferential grooves axially spaced from each other to form a plurality of lands between each pair of adjacent grooves; sealing collars mounted on said lands; and guide semi-rings having T-shaped cross-sections mounted between said sealing collars, characterized in that said guide semi-rings are accommodated in said grooves and said sealing collars are accommodated on said lands of said rod.

* * * * *